(12) United States Patent
Libin

(10) Patent No.: US 7,616,091 B2
(45) Date of Patent: *Nov. 10, 2009

(54) ACTUATING A SECURITY SYSTEM USING A WIRELESS DEVICE

(75) Inventor: Phil Libin, Cambridge, MA (US)

(73) Assignee: CoreStreet, Ltd., Cambridge, MA (US)

( * ) Notice: Subject to any disclaimer, the term of this patent is extended or adjusted under 35 U.S.C. 154(b) by 352 days.

This patent is subject to a terminal disclaimer.

(21) Appl. No.: 11/639,387

(22) Filed: Dec. 14, 2006

(65) Prior Publication Data

US 2007/0200662 A1 Aug. 30, 2007

Related U.S. Application Data

(63) Continuation of application No. 10/985,348, filed on Nov. 10, 2004, now Pat. No. 7,205,882.

(51) Int. Cl.
*G05B 19/00* (2006.01)
*G06F 7/00* (2006.01)
*G06K 19/00* (2006.01)
*H04B 1/00* (2006.01)

(52) U.S. Cl. .................. 340/5.28; 340/5.22; 340/5.6; 340/5.8; 455/420; 455/557

(58) Field of Classification Search ......... 340/5.6–5.64; 455/420, 557; 70/63, 168
See application file for complete search history.

(56) References Cited

U.S. PATENT DOCUMENTS

| | | | |
|---|---|---|---|
| 5,245,652 A * | 9/1993 | Larson et al. ............ 379/102.06 |
| 5,382,778 A * | 1/1995 | Takahira et al. ............ 235/380 |
| 5,666,416 A | 9/1997 | Micali |
| 5,936,544 A * | 8/1999 | Gonzales et al. ............ 340/5.22 |
| 6,317,025 B1 * | 11/2001 | Leon et al. ................ 340/5.21 |
| 6,480,096 B1 * | 11/2002 | Gutman et al. ............ 340/5.31 |
| 6,873,824 B2 * | 3/2005 | Flick ........................ 455/41.2 |
| 6,975,202 B1 * | 12/2005 | Rodriguez et al. ......... 340/5.25 |
| 7,012,503 B2 * | 3/2006 | Nielsen ..................... 340/5.6 |
| 2002/0123336 A1 * | 9/2002 | Kamada .................... 455/420 |
| 2002/0180582 A1 | 12/2002 | Nielsen |

FOREIGN PATENT DOCUMENTS

| WO | WO01/41075 A1 | 6/2001 |
| WO | WO02/095689 A1 | 11/2002 |
| WO | WO2004/034334 A1 | 4/2004 |

* cited by examiner

*Primary Examiner*—Brian A Zimmerman
*Assistant Examiner*—Nam V Nguyen
(74) *Attorney, Agent, or Firm*—Muirhead and Saturnelli, LLC

(57) ABSTRACT

Actuating a security system includes providing a first set of access codes to a wireless device and causing the wireless device to transmit the first set of access codes to a first controller that actuates the security system. The first set of access codes provided to the wireless device may expire. Actuating a security system may also include providing expiration dates for each of the first set of access codes provided to the wireless device. Actuating a security system may also include examining each of the expiration dates and, in response to a particular expiration date being prior to a current date, erasing from the wireless device a particular one of the first set of access codes that corresponds to the particular expiration date.

17 Claims, 8 Drawing Sheets

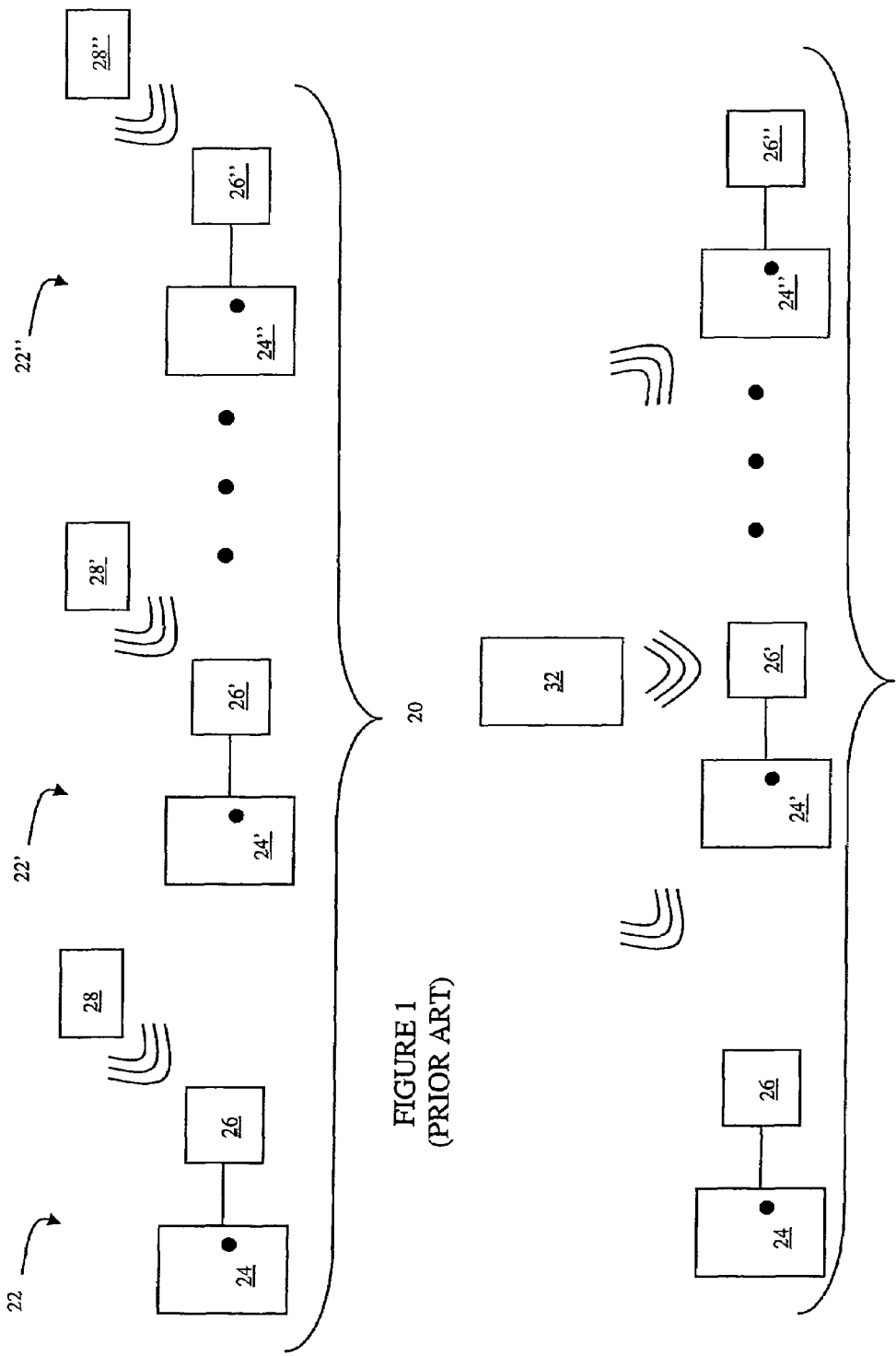

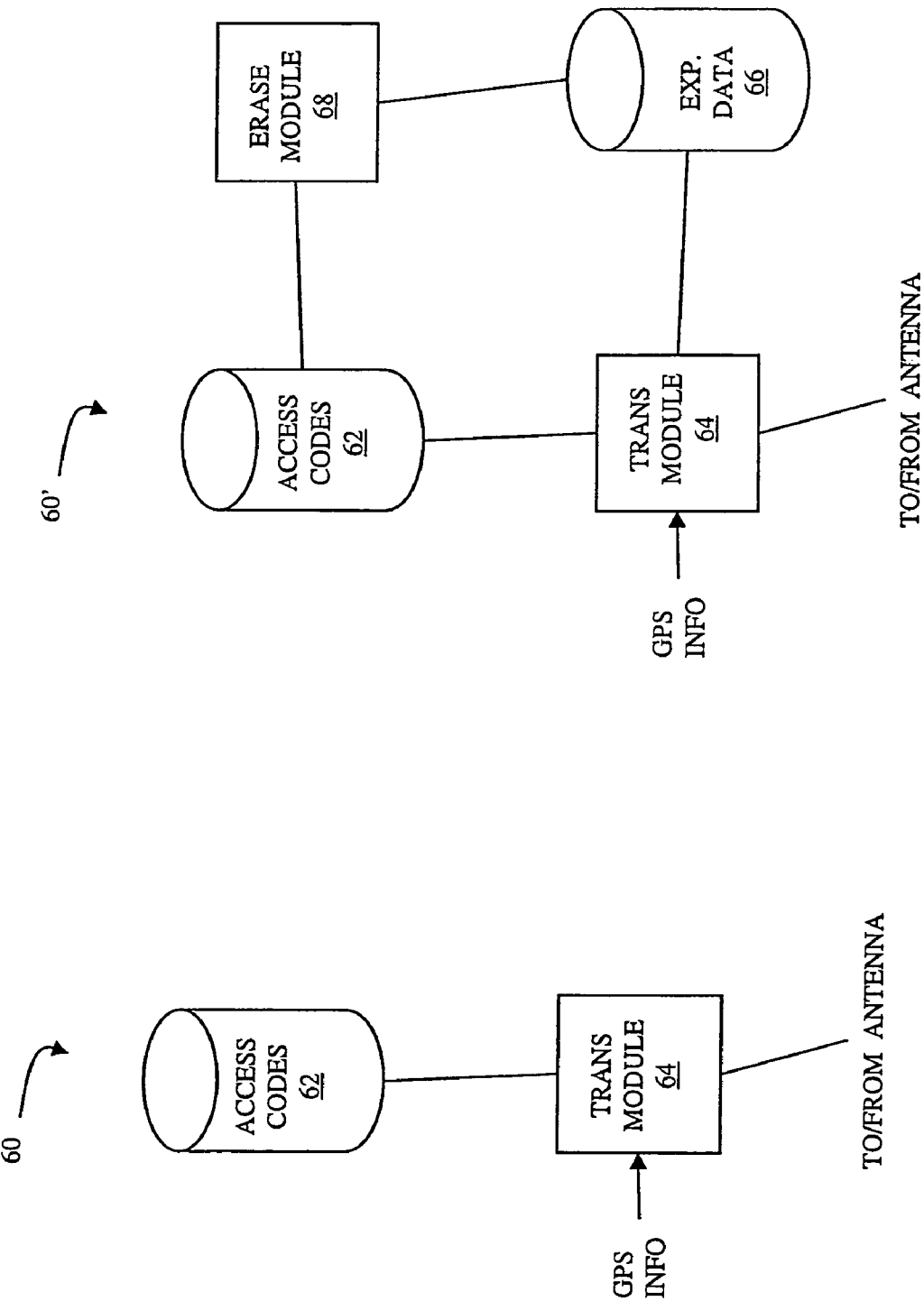

ACTUATING A SECURITY SYSTEM USING A WIRELESS DEVICE

This application is a continuation of U.S. patent application Ser. No. 10/985,348, filed Nov. 10, 2004, now U.S. Pat. No. 7,205,882 B2, which is incorporated by reference herein.

BACKGROUND OF THE INVENTION

1. Technical Field

This application relates to the field of security systems, and more particularly to the field of actuating security systems using a wireless devices.

2. Description of Related Art

In many instances, a facility or group of facilities may have multiple diverse physical access security systems used to provide employees and others with selective physical access to restricted areas. Each of the systems may use its own unique smart cards, badges, and codes to provide for entry to a restricted area. The different systems may have been installed at different times and/or purchased from different vendors. In addition, an organization may acquire a facility and inherit whatever physical access security systems that had already been installed.

Referring to FIG. 1, a group 20 of physical access security systems 22, 22', 22" represents any number of systems located in a single building or in different buildings, including different buildings in geographically disperse areas. Each of the systems may include a door 24, 24', 24" (or similar) that selectively provides access to a restricted area. Each of the doors may be mechanically locked or unlocked by a controller 26, 26', 26" that sends a signal to actuate a lock mechanism for each of the doors 24, 24', 24".

The controllers 26, 26', 26" determine whether to actuate the lock mechanisms for the doors 24, 24', 24" based on access codes received from each of a plurality of smart cards 28, 28', 28". The term "smart cards" may be understood herein to include badges, keychain devices, or any other conventional portable electronic mechanism capable of transmitting access codes to the controllers 26, 26', 26". Each of the controllers 26, 26', 26" may be programmed to accept (i.e., unlock the doors 24, 24', 24") certain access codes from certain cards (devices) while rejecting others. Similarly, each of the smart cards 28, 28', 28" may be programmed to actuate certain ones of the controllers 26, 26', 26" and not others. However, in some cases, if the systems 22, 22', 22" are provided by different manufacturers/vendors, it may not be possible, for example, to program the controller 26 to accept any codes from the cards 28', 28' or to program the cards 28', 28" to actuate the controller 26. Thus, a user who, for example, is to be allowed access to an area restricted by the door 24 and to another area restricted by the door 24' would need to carry both the card 28 and the card 28'. In addition to the potential logistical difficulties associated with issuing multiple cards to users and programming multiple systems, there are also security concerns that arise in connection with difficulties associated with the need to have, for example, a terminated employee return all his cards and/or reprogram multiple systems to not accept the cards of the terminated employee.

It is desirable to provide a mechanism to address the deficiencies described above.

SUMMARY OF THE INVENTION

According to the present invention, actuating a security system includes providing a first set of access codes to a wireless device and causing the wireless device to transmit the first set of access codes to a first controller that actuates the security system. The first set of access codes provided to the wireless device may expire. Actuating a security system may also include providing expiration dates for each of the first set of access codes provided to the wireless device. Actuating a security system may also include examining each of the expiration dates and, in response to a particular expiration date being prior to a current date, erasing from the wireless device a particular one of the first set of access codes that corresponds to the particular expiration date. Actuating a security system may also include causing a particular one of the first set of access codes to be erased by modifying a corresponding expiration date thereof. Actuating a security system may also include providing to the wireless device a final value that corresponds to at least one of the first set of access codes, wherein the final value is the result of applying a one way hash function a plurality of times. Actuating a security system may also include periodically providing a value to the wireless device, applying the one way hash function to the value to obtain a result thereof, and erasing the at least one of the first set of access codes corresponding to the final value in response to the result of applying the one way hash function not being equal to the final value. The period may be one day. Actuating a security system may also include determining if there has been tampering with the wireless device and, in response to tampering, erasing all of the first set of access codes. Actuating the security system may also include determining a subset of the first set of access codes that are to be transmitted by the wireless device. Determining the subset may include using information transmitted to the wireless device by the first controller. Determining the subset may include using GPS information. Determining the subset may include prompting a user of the wireless device. Actuating a security system may also include performing error processing in response to there being no access codes in the subset. Actuating a security system may also include providing a first table containing possible users, and providing a second table containing possible access codes. Actuating a security system may also include receiving authorization information for a particular user and a particular subset of the first set of access codes and storing in the wireless device the particular subset of the first set of access codes. The authorization information may be authenticated. Actuating a security system may also include logging instances of the wireless transmitting the first set of the access codes to the first controller. The instances may be logged by storing data at the wireless device and/or at the first controller. The instances may be transmitted to a central processor. The wireless device may be a cell phone. Actuating the security system may actuate a lock to allow access to a restricted area. Actuating the security system may include providing a second set of access codes to the wireless device and causing the wireless device to transmit the second set of access codes to a second controller, wherein the first and second controllers are incompatible.

According further to the present invention, a computer program product provided in a storage medium includes executable code that provides a first set of access codes to a wireless device and executable code that causes the wireless device to transmit the first set of access codes to a first controller that actuates a security system. The first set of access codes provided to the wireless device may expire. The computer program product may also include executable code that provides expiration dates for each of the first set of access codes provided to the wireless device. The computer program product may also include executable code that examines each of the expiration dates and executable code that erases from the wireless device a particular one of the first set of access codes that corresponds to the particular expiration date in response to a particular expiration date being prior to a current date. The computer program product may also include executable code that causes a particular one of the first set of access codes to be erased by modifying a corresponding expiration date thereof. The computer program product may also include executable code that provides to the wireless device a final value that corresponds to at least one of the first set of access codes, where the final value is the result of applying a one way hash function a plurality of times. The computer program product may also include executable code that periodically provides a value to the wireless device, executable code that applies the one way hash function to the value to obtain a result thereof, and executable code that erases the at least one of the first set of access codes corresponding to the final value in response to the result of applying the one way hash function not being equal to the final value. The period may be one day. The computer program product may also include executable code that determines if there has been tampering with the wireless device and executable code that erases all of the first set of access codes in response to tampering. The computer program product may include executable code that determines a subset of a plurality of the first set of access codes that are to be transmitted by the wireless device. Executable code that determines the subset may use information transmitted to the wireless device by the first controller. Executable code that determines the subset may use GPS information. Executable code that determines the subset may prompt a user of the wireless device. The computer program product may also include executable code that performs error processing in response to there being no access codes in the subset. The computer program product may also include a first table containing possible users stored in memory and a second table containing possible access codes stored in memory. The computer program product may also include executable code that receives authorization information for a particular user and a particular subset of the first set of access codes and executable code that stores in the wireless device the particular subset of the first set of access codes. The authorization information may be authenticated. The computer program product may also include executable code that logs instances of the wireless device transmitting access codes to the first controller. The instances may be logged by storing data at the wireless device. The computer program product may also include executable code that transmits the instances to a central processor. The instances may be logged by storing data at the first controller. The computer program product may also include executable code that transmits the instances to a central processor. The wireless device may be a cell phone. Executable code that actuates the security system may actuate a lock to allow access to a restricted area. The computer program product may also include executable code that provides a second set of access codes to the wireless device and executable code that causes the wireless device to transmit the second set of access codes to a second controller, where the first and second controllers are incompatible.

According further to the present invention, a cell phone that provides access to restricted areas includes a storage medium, a transmission module coupled to the storage medium, executable code stored in the storage medium that accepts access codes provided to the cell phone, and executable code that causes the access codes to be provided to the transmission module for transmission by the cell phone. The cell phone may also include executable code that stores a final value in the storage medium, wherein the final value corresponds to at least one access code and wherein the final value is the result of applying a one way hash function a plurality of times, executable code that periodically accepts a value, executable code that applies the one way hash function to the value to obtain a result thereof, and executable code that erases the at least one access codes corresponding to the final value in response to the result of applying the one way hash function not being equal to the final value.

BRIEF DESCRIPTION OF DRAWINGS

FIG. 1 illustrates a prior art collection of physical access security systems.

FIG. 2 illustrates a collection of physical access security systems that may be actuated using a cell phone according to the system described herein.

FIG. 5 is a data flow diagram illustrating software of a cell phone according to the system described herein.

FIG. 6 is a data flow diagram illustrating software of a cell phone according to the system described herein.

DETAILED DESCRIPTION OF VARIOUS EMBODIMENTS

Figure 3:
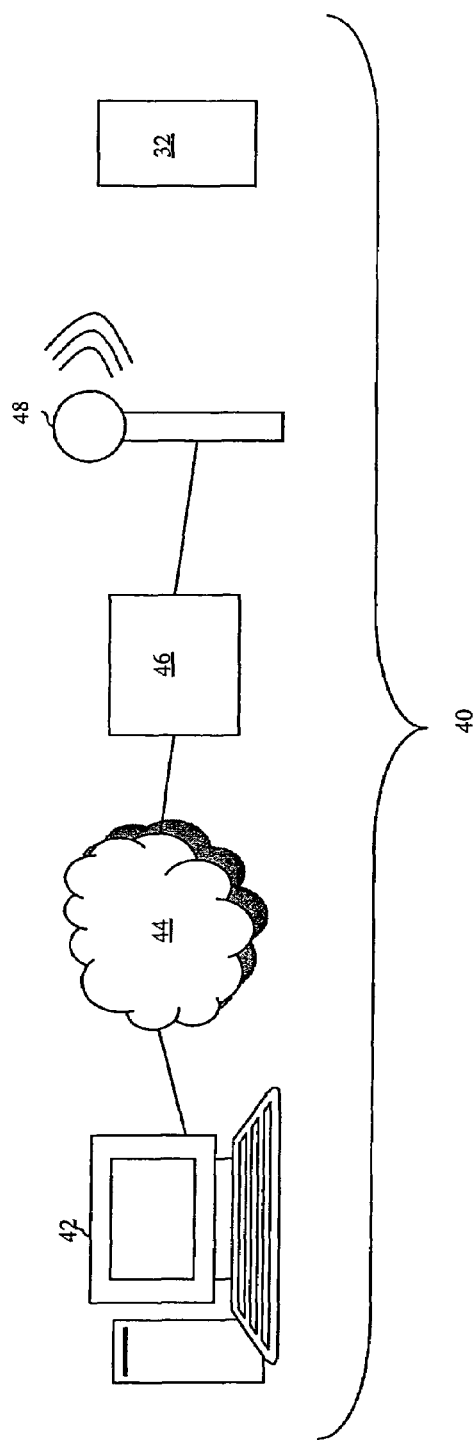
FIG. 3 illustrates a mechanism for programming a cell phone according to the system described herein.

Referring to FIG. 2, a security system 30 includes the doors 24, 24', 24" and the controllers 26, 26', 26" that are described above in connection with FIG. 1. The system 30 also includes a cell phone 32 that may transmit access codes to one or more of the controllers, 26, 26', 26" to cause a corresponding one of the doors 24, 24', 24" to open and allow access to a restricted area. The cell phone 32 transmits access codes in a manner that is identical or sufficiently similar to the access codes transmitted by the smart cards 28, 28', 28".

As described elsewhere herein, the cell phone 32 may be programmed with access codes so that each of the controllers 26, 26', 26" receives the same or similar access codes from the cell phone 32 that would be received from an appropriate one of the smart cards 28, 28', 28" to open appropriate ones of the doors 24, 24', 24". Programming the cell phone 32 with the access codes is described in more detail elsewhere herein. The cell phone 32 may be programmed from an external source that monitors and issues access codes according to appropriate organizational rules. In some instances, the access codes may expire or may be made to expire in a way that reduces the likelihood that an unauthorized user (e.g., a recently-fired employee) could use the cell phone 32 to gain unauthorized access after the expiration period.

The system 30 provides many advantages over the system 20 described above in connection with FIG. 1. For example, a user need not carry multiple smart cards like the smart cards 28, 28', 28", but instead, may simply carry the single cell phone 32. In addition, since most people have a cell phone anyway, then using the cell phone 32 to provide access to different systems does not generate extra inconvenience. In general, the cell phone 32 integrates the system 30 from the perspective of a user of the cell phone 32 without requiring separate and specific integration of each potentially incompatible portion of the system 30. Portions of the system may be incompatible for any one or more of a number of reasons, including being made by different manufacturers, being different versions or different models from the same manufacturer, and/or being installed at different times and/or by different organizations or subsets of the same organization.

The user may use the cell phone 32 as he would use a smart card and waves the cell phone 32 in front of a reader portions of the controllers 26, 26', 26" to gain access. In an embodiment herein, the cell phone 32 uses the Philips Near Field Communication (NFC) technology/chip set to facilitate transmission of access codes to the controllers 26, 26', 26". The Philips NFC technology is available from the Philips Corporation and implementation thereof in the system described herein is straight-forward to one of ordinary skill in the art using information provided by Philips. Note, however, that other suitable hardware and/or software may be used in place of the Phillips NFC technology, where the other technology provides the same or similar functionality as the Phillips NFC technology to be able to emulate one or more types of contactless devices Referring to FIG. 3, a diagram 40 illustrates programming the cell phone 32 according to the system described herein. Many cell phone carriers and manufacturers provide a mechanism for programming cell phones and/or providing data thereto using the Internet, the cellular telephone network, and/or mechanisms built into commercially-available cell phones. In an embodiment herein, a user uses a conventional computer workstation 42 or the equivalent to initiate the transfer of data and/or programming information to the cell phone 32 to implement the system described herein. The workstation 42 is coupled to a network 44, such as the Internet, which is also coupled to cellular telephone transmission and interface circuitry 46 provided by a cellular carrier. The built-in transfer mechanisms provided by the carriers and the cell phone manufacturers allow data/programs that are provided via the Internet to be transmitted and stored in the cell phone 32.

The cellular transmission circuitry 46 is coupled to a cellular transmission tower (antenna) 48 that transmits appropriate data/programs to the cell phone 32. Of course, a conventional cellular telephone network includes many cell phone towers and the particular one of the towers that transmits to the cell phone 32 may include, for example, the tower that is closest to the cell phone 32 at the time of the transfer.

Figure 4:
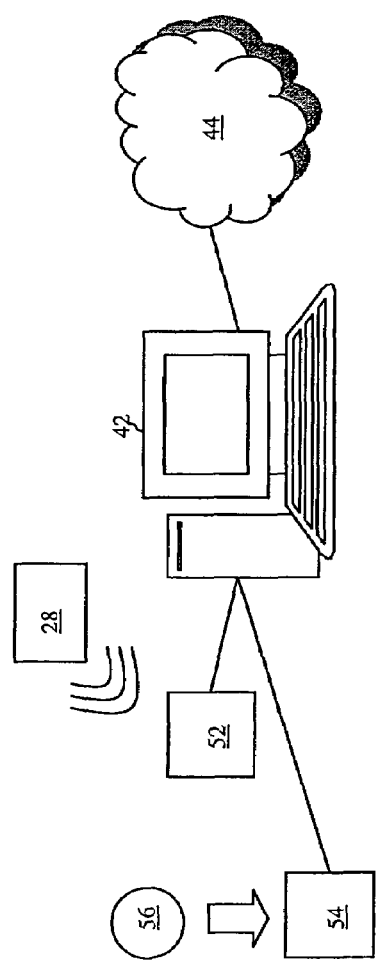
FIG. 4 illustrates a mechanism for providing access codes to a workstation that is used to program a cell phone according to the system described herein.

Referring to FIG. 4, the user workstation 42 is shown in more detail as being attached to a card reader 52 and a disk reader 54. The card reader 52 may be used to obtain access code information from the smart card 28 (or other smart cards or other similar access devices). Thus, in an embodiment herein, access code information is provided directly by the smart card 28 to the card reader 52 where the card reader 52 then provides the data to the workstation 42. Then, as described elsewhere herein, the workstation 42 provides the access codes (and possibly other data/programs) to the cell phone 32 via the network 44.

In other instances, information for programming the cell phone 32 may be provided by a disk 56 that may be provided by a manufacturer of a physical access security system or by some other source. The disk 56 is provided to the disk reader 54 which then provides the data to the workstation 42 for subsequent programming of the cell phone 32 over the network 44. In still other embodiments, a user may directly enter data into the workstation 42 using, for example, a keyboard of the workstation 42, to type in access codes (and/or other appropriate information) that is subsequently provided to the cell phone 32.

Management of security rules and procedures for the workstation 42 may be provided by any appropriate mechanism, including any and all mechanisms disclosed in U.S. patent application Ser. No. 10/893,126 (the '126 application) filed on Jul. 16, 2004, which is incorporated by reference herein. Thus, for example, certain access codes may not be made available for transferring to the cell phone 32 unless a user of the workstation has been issued appropriate credentials. Note also that authorization/credentials for the workstation may be entered via the keyboard, transferred to the workstation 42 via the network 44, and/or provided to the workstation 42 by any appropriate means.

Referring to FIG. 5, a diagram 60 illustrates modules (software and/or hardware) that may be provided internally to the cell phone 32 to facilitate use and promulgation of access codes thereby. The modules in the cell phone 32 (and other modules in the cell phone 32 described herein) may be installed by the manufacturer of the cell phone 32, installed by a user, downloaded (in the case of software) to the cell phone 32 in a manner similar to the mechanism described above in connection with the diagram 40 of FIG. 3, or some combination thereof. The modules include an access code data element 62 that contains the access codes provided to the cell phone 32. The access code data element 62 is coupled to a transmission module 64 that is part of the cell phone and includes an appropriate combination of hardware and software to facilitate transmission by the cell phone 32 of access codes from the access code data element 62. The transmission module 64 may be coupled to the antenna of the cell phone 32.

In some embodiments, the transmission module 64 may receive GPS data indicating the geographic location of the cell phone 32. The GPS data may be received and processed by a built-in internal mechanism of the cell phone 32. As described in more detail elsewhere herein, in embodiments where the transmission module 64 receives GPS data, the transmission module 64 may use the GPS data to select appropriate ones of the access codes from the access codes data element 62. For example, if the access codes data element 64 contains access codes for physical access security systems in Boston, New York, and Washington, D.C., and if the GPS data indicates that the cell phone 32 is located in Boston, then the transmission module 64 would reduce the number of possible access codes by using only access codes from the access codes data element 64 that correspond to systems in Boston.

In some instances, an existing access code scheme may include built-in expirations for access codes. For example, for some systems, access codes may automatically expire after a certain amount of time (e.g., one day). Thus, as long as a user who has possession of the cell phone 32 is authorized for a particular type of access, new access codes may be periodically sent to the cell phone 32 as appropriate. When the user no longer requires or is no longer allowed access to a particular area, no new access codes for that area are sent to the cell phone 32. Thus, systems with built-in expirations for access codes allow for management of access codes by simply deciding whether to provide new access codes to the cell phone 32 after each period of expiration of old access codes. However, for some systems, the access codes may not expire or, alternatively, the amount of time it takes for access codes to expire may be longer than desired. In such systems, it may be useful to provide a mechanism to cause access codes to be erased from the cell phone 32.

Referring to FIG. 6, a diagram 60' illustrates a different version of the software for the cell phone 32. The software includes the access code data element 62 and the transmission module 64 as described above in connection with the diagram 60 of FIG. 5. However, the diagram 60' also shows an expiration data element 66 and an erase module 68. For some or all of the access codes in the access code data element 62, the expiration data 66 may have a corresponding expiration date. The erase module 68 uses the expiration data from the expiration data element 66 to selectively erase access codes from the access codes data element 62 so that the cell phone 32 may no longer be used to provide the specific access granted by the erased access codes. This is described in more detail elsewhere herein.

Figure 7:
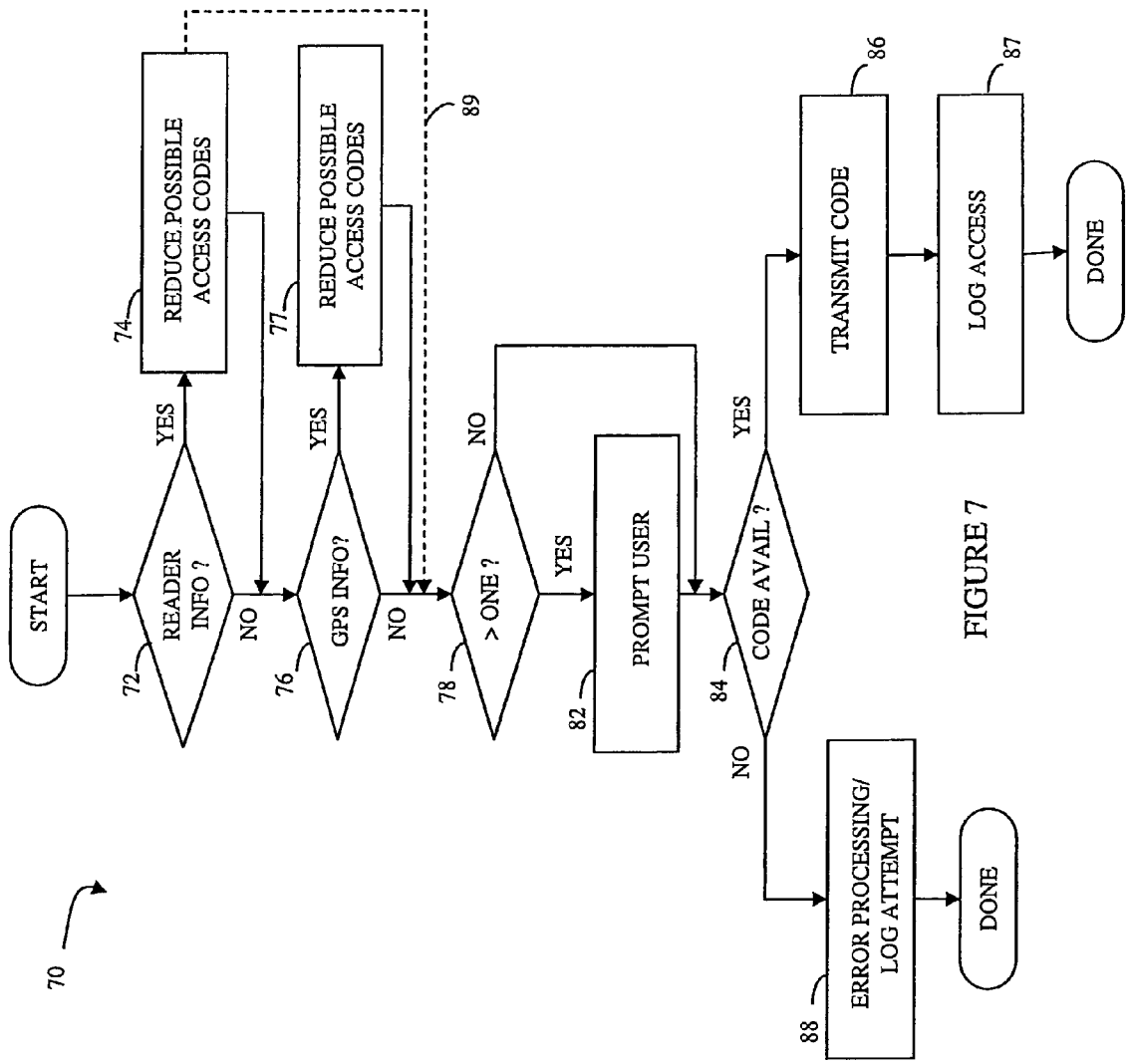
FIG. 7 is a flow chart illustrating steps performed by a transfer module of a cell phone according to the system described herein.

Referring to FIG. 7, a flow chart 70 illustrates steps performed by software of the transmission module 64 to determine which of the access codes from the access codes data element 62 should be transmitted. Note that, for some embodiments, it may be possible, in each instance, to simply transmit to a reader all of the access codes in the access codes data element 62. However, there may be drawbacks to this approach, including possible security compromises and the possibility that an access code reader may stop working and deny all attempted access (legitimate and otherwise) if the reader receives too many invalid access codes. Thus, in some instances, it is desirable to have the transmission module 64 select for transmission certain access codes from the access codes data element 62.

Processing for the flow chart 70 begins at a test step 72, where it is determined if the reader (e.g., the card reader associated with the controller 26) has provided location information to the cell phone 32. For some embodiments, it is possible to have the cell phone 32 receive information (via the antenna) from the reader to enable the cell phone 32 to select an appropriate subset of access codes from the access code data element 62. If it is determined at the test step 72 that reader information is available, then control transfers from the step 72 to a step 74, where the number of possible access codes is reduced based on information from the reader. That is, if the reader indicates that the reader is in a particular city, access codes for other cities are not to be used, and thus are eliminated as possible access codes to transmit (but not necessarily erased from the access codes data element 62).

If it is determined at the step 72 that there is no reader information available, then control transfers from the step 72 to a test step 76 where it is determined if GPS information is available. As discussed above, in some instances, it is possible to provide GPS information to the transfer module 62 using, for example, GPS information received by the cell phone 32 and processed within. If it is determined at the step 76 that GPS information is available, then control transfers from the step 76 to a step 77, where, as with the step 74, discussed above, the number of possible access codes is reduced.

Following the step 77, or following the step 76 if GPS information is not available, is a test step 78 where it is determined if there is more than one possible access code that may be provided. Note that, with or without GPS information and/or reader information, there may still be more than one possible access code that may be transmitted by the cell phone 32 (e.g., two doors in close proximity to each other with different access codes). Note also that it is possible for the cell phone 32 to be programmed with only one access code, so that, irrespective of the availability of GPS information and/or reader information, there will only be one access code at the step 78. In some cases, the cell phone 32 may be programmed only in connection with a user traveling to a specific remote location and then only with the access codes for that location, in which case the access codes may be erased from the cell phone 32 after the user returns from the remote location. Erasing access codes is described in more detail elsewhere herein.

If it is determined at the step 78 that there is more than one possible access code, then control transfers from the step 78 to a step 82 where a user is prompted to select from the more than one possible access code. Prompting at the step 82 uses built-in capabilities of the cell phone 32 to present a list of possible access codes (or a list of possible locations corresponding to the access codes) from which a user may select one. The cell phone 32 may use, for example, the java programming language (scripts) and a java virtual machine or use any other appropriate techniques for prompting a user and receiving a response thereto.

Following the step 82, or following the step 78 if there is not more than one possible access code, is a test step 84 where it is determined if there is an access code that is available for use. Note that the result of filtering at the steps 74, 77, 82 may causes there to be no usable access codes. Also note that, in some embodiments, it may be possible for a user to select "none" (or the equivalent) at the prompt provided at the step 82. It is also possible that the cell phone 32 has not been programmed with any access codes or at least has not been programmed with access codes consistent with the GPS information and/or the reader information.

If it is determined at the test step 84 that there is an access code available, then control transfers from the step 84 to a step 86 where the access code is transmitted by, for example, having the transmission module 64 provide appropriate signals to the antenna of the cell phone 32.

Following the step 86 is a step 87, where the use of the cell phone for physical access is logged. It is possible to log uses of the cell phone 32 by either logging each use at the cell phone 32 (i.e., logging uses within the cell phone), logging each use at the corresponding reader (i.e., logging uses within the reader), or both. Logging uses at the cell phone 32 may be facilitated by the reader providing identifying information to the cell phone 32. Logging uses may include using any or all of the logging mechanisms discussed in U.S. patent application Ser. No. 10/893,174 filed on Jul. 16, 2004, which is incorporated by reference herein. In some embodiments, some or all of the log entries at the readers and/or at the cell phone 32 may be transmitted to a central processor, such as the workstation 42, to determine if there have been any attempted unauthorized accesses and/or successful accesses.

If it is determined at the step 84 that there is not an access code to be transmitted by the cell phone 32, then control transfers from the step 84 to a step 88 where error processing is performed. The error processing performed at the step 88 may include, for example, providing a message to the user via the cell phone 32. The error processing performed at the step 88 may also include logging the attempted entry.

In some embodiments, the availability of reader information may negate the need for any GPS information because, in some cases, there may be more usable granularity to the reader information than can be provided by GPS information. In such cases, when reader information is available, the test at the step 76 for the availability of GPS information may be omitted. This is illustrated by an alternative flow path 89 from the step 74 to the step 78.

Figure 8:
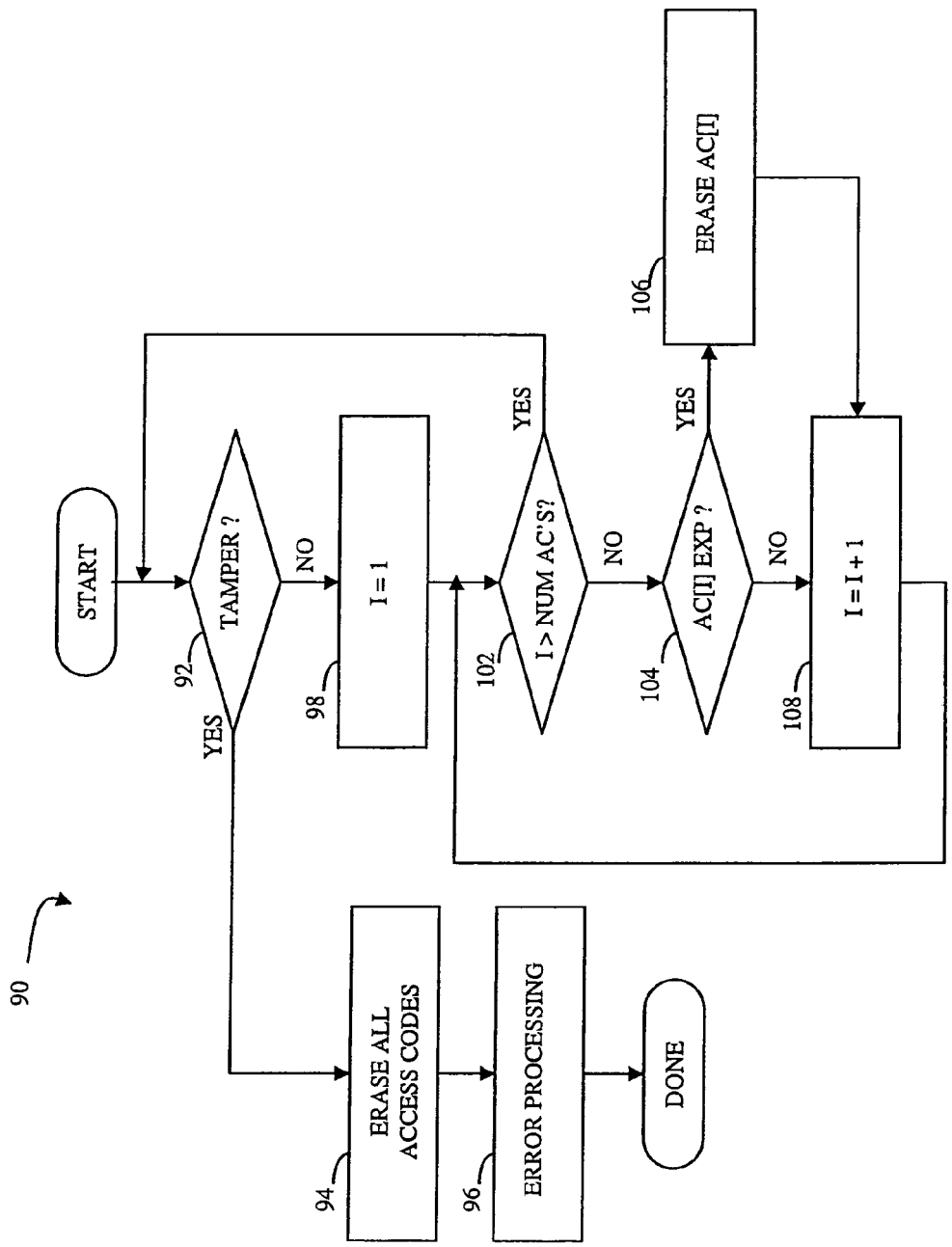
FIG. 8 is a flow chart illustrating steps performed in connection with an embodiment for eliminating access codes from a cell phone according to the system described herein.

Referring to FIG. 8, a flow chart 90 illustrates steps performed by the erase module 68 of FIG. 6. Processing begins at first step 92, which determines if there has been any tampering with the cell phone 32. In an embodiment herein, the cell phone 32 may be equipped with means to detect tampering thereto so that a user may not use the cell phone 32 to gain unauthorized access. The tamper detection mechanism for the cell phone 32 may be any appropriate mechanism including any one of a plurality of conventional tamper detection mechanisms that may be used with electronic devices like the cell phone 32.

If it is determined at the test step 92 that there has been tampering with the cell phone 32, then control transfers from the test step 92 to a step 94 where all of the access codes for the cell phone 32 are erased, thus reducing the possibility that the cell phone 32 may be used for unauthorized access. Following the step 94 is a step 96 which performs error processing. The error processing performed at the step 96 may include alerting the user or others that tampering has been detected and/or disabling all other facilities (e.g., voice calling) of the cell phone 32. Following the step 96, processing is complete. In an embodiment herein, once the cell phone 32 has been tampered with, it may no longer be used for access unless and until the source of the tampering is detected and/or the cell phone 32 has been reset in a secure fashion.

If it is determined that the test step 92 that there has been no tampering with the cell phone 32, then control transfers from the test step 92 to a step 98 where an index variable, I, is set equal to one. The index variable I may be used to iterate through the various access codes stored in the access codes data element 62.

Following the step 98 is a test step 102 which determines if the index variable, I, is greater than the number of access codes (i.e., if all of the access codes have been examined). If so, then control transfers from the test step 102 back to the step 92 to start another iteration of checking for expiration of access codes. Otherwise, control transfers from the test step 102 to a test step 104 which determines if the Ith access code has expired. The test at the step 104 may be fairly straightforward and may include, for example, comparing the current date with the expiration date stored in the expiration data element 66.

If it is determined at the test step 104 that the Ith access code has expired, then control transfers from the test step 104 to step 106 where the Ith access code is erased from the access code data element 62 of the cell phone 32. Erasing the Ith access code from the access code data element 62 of the cell phone 32 provides that the cell phone 32 may no longer be used for access to an area that was previously accessed using the Ith access code. Following the step 106 or following the test step 104 if the Ith access code has not expired, is a step 108 where the index variable, I, is incremented. Following the step 108, control transfers back to the test step 102, discussed above.

The expiration dates associated with access codes may be provided with the access codes (i.e., provided to the cell phone 32 when the access codes are provided) or may be provided separately at different times. Note also that, in some instances, it may be possible to cause access codes to be erased by modifying the expiration date and using the software that compares the expiration date with the current date.

In some instances, it may be desirable to provide a more secure mechanism for extending or erasing access codes in the cell phone 32. One technique for enhancing security may include using a mechanism similar to that disclosed in U.S. Pat. No. 5,666,416, which is incorporated by reference herein. In such a case, when new access codes are provided to the cell phone 32, a final value (FV) is also provided. Then, for each new period (e.g., one day) that the access codes are still valid, a new value is provided that may be used with the FV to confirm that the access codes are still valid.

Figure 9:
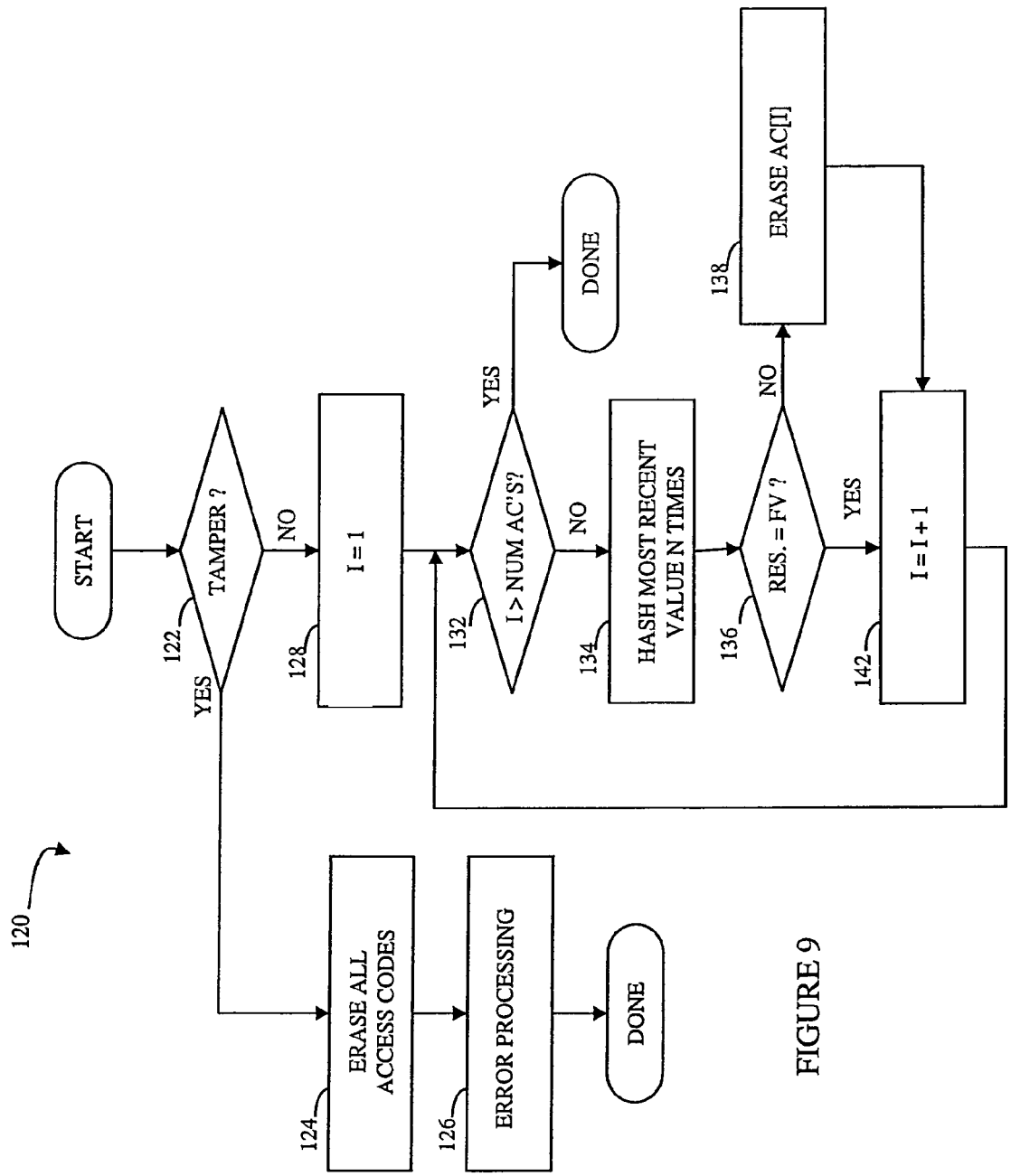
FIG. 9 is a flow chart illustrating steps performed in connection with an alternative embodiment for eliminating access codes from a cell phone according to the system described herein.

Referring to FIG. 9, a flow chart 120 illustrates an alternative embodiment of processing that may be performed in the cell phone 32 for determining when to erase an access code. The processing illustrated by the flow chart 120 uses the mechanism disclosed in U.S. Pat. No. 5,666,416, which is incorporated by reference herein, to cause a new value to be transmitted to the cell phone 32 periodically to maintain the viability of access codes. That is, if at every new period the cell phone 32 receives an appropriate value, then the corresponding access codes are not erased. Otherwise, if the appropriate value is not received by the cell phone 32, then the corresponding access codes are erased.

Processing begins at a first step 122 which determines if the cell phone 32 has been tampered with, as discussed above in connection with the step 92 of the flow chart 90 of FIG. 8. If so, then control transfers from the test step 122 to a step 124 where all access codes in the access code data element 62 are erased. Following the step 124 is a step 126 where an error is posted, as discussed above in connection with the step 94 of the flow chart 90 of FIG. 8. Following step 126, processing is complete.

If it is determined at the test step 122 that the cell phone 32 has not been tampered with, then control transfers from the step 122 to a step 128 where an index variable, I, is set equal to one. The index variable I may be used to iterate through the access codes of the access code data element 62. Following the step 128 is a test step 132 which determines if the index variable, I, is greater than the number of access codes. If so, then processing is complete. Otherwise, control transfers from the test step 132 to a step 134 where the most recent value that has been provided for the access code is hashed N times where N equals the number of periods. Thus, for example, if each period is one day, and it has been twelve days since a particular access code was initially provided, then the most recent value is hashed N times. The hash function may be a one way hash function as described in U.S. Pat. No. 5,666,416. Following the step 134 is a test step 136 which determines if the result of hashing the incoming value N times equals the final value, FV, associated with the access codes. The test at the step 136 corresponds to the mechanism disclosed in U.S. Pat. No. 5,666,416. If it is determined at the test step 136 that the values are not equal (e.g., the Nth hash of the most recent value does not equal FV), then control transfers from the test step 136 to a step 138 where the Ith access code (or set of access codes) is erased from the access code data element 62. Following the step 138 or following the test step 136 if the values are equal, is a step 142 where the index variable, I, is incremented. Following the step 142, control transfers back to the step 132 discussed above.

Figure 10:
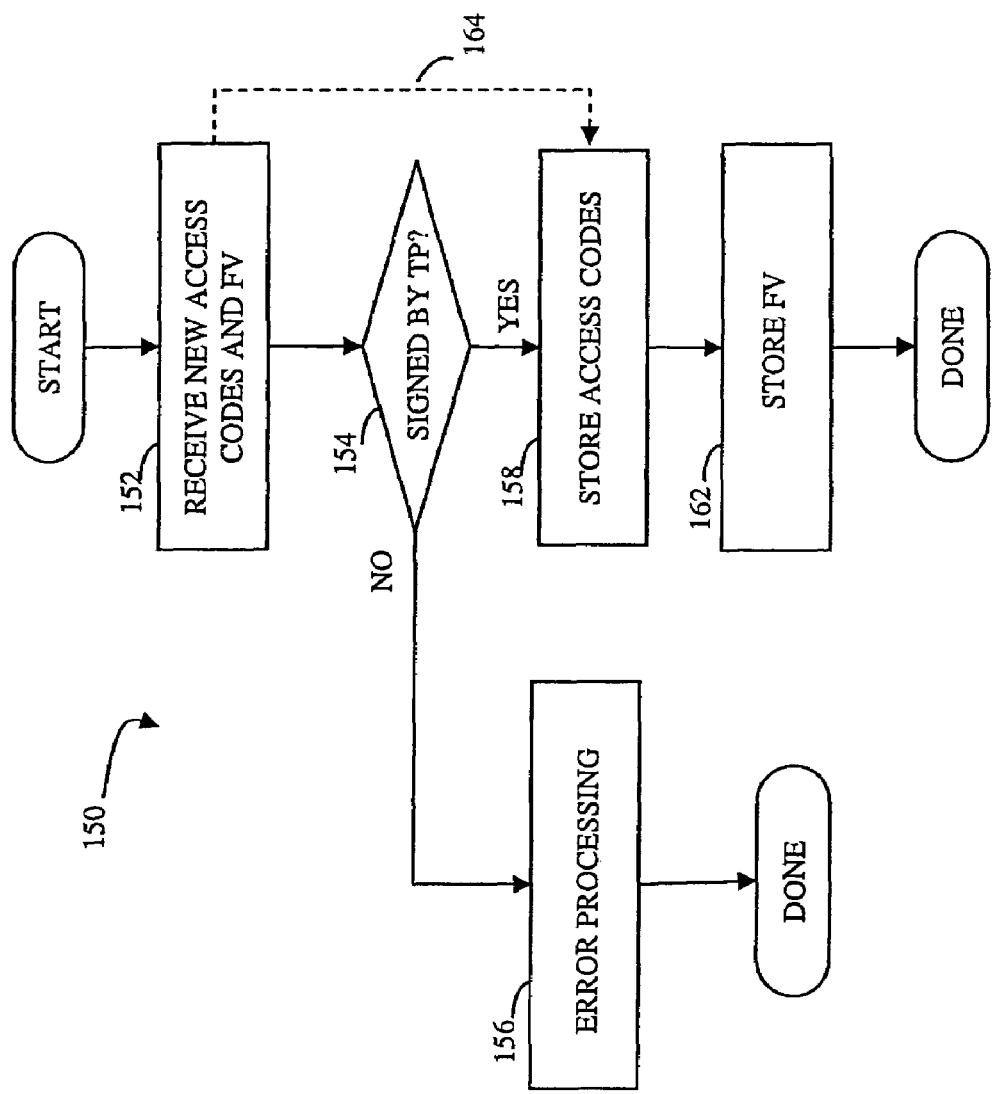
FIG. 10 is a flow chart illustrating steps performed in connection with initializing a cell phone with access codes and other data according to an embodiment of the system described herein.

Referring to FIG. 10, a flow chart 150 illustrates steps performed in connection with receiving new access codes that are maintained in connection with the processing performed by the flow chart 120 of FIG. 9. Processing begins at a first step 152 where new access codes, and additional data (i.e., FV), are received. Following the step 152 is a test step 154 where it is determined if the access codes and additional data have been signed by a trusted party. The signature scheme used as well as the mechanism and policy used for determining who and who is not a trusted party may be set according to appropriate policies and procedures of an organization. If it is determined at the test step 154 that the new access codes and additional data have not been signed by a trusted party, then control transfers from the test step 154 to a step 156 where error processing is performed. The error processing performed at this step 156 may include, for example, notifying the user that new access codes have been received but that the access codes were not signed by a trusted party. Following the step 156, processing is complete.

If it is determined at the test step 154 that the new access codes and additional data provided to the cell phone 32 have been signed by a trusted party, then control transfers from the test step 154 to a step 158 where the access codes are stored in the cell phone 32 in, for example, the access code data element 62. Following the step 158 is a test step 162 where the FV used for periodically determining if access is still authorized is also stored, for example, in the expiration data element 66. Following the step 162, processing is complete.

In some instances, it is possible to not require that new access codes and additional data be signed by a trusted party. This is indicated in the flow chart 150 by an alternative path 164 that shows control transferring from the step 152 to the step 158.

In some instances, it may be possible to create one or more special purpose users (e.g. visiting users and/or metausers) at each of the physical access security systems where the special purpose user may be used exclusively for access by the cell phone 32. In an embodiment herein, one special purpose user may be created for each possible system that accessed by the cell phone 32. In other embodiments, there may be more that one special purpose user for each physical access security system. For example, there may be as many special purpose users for one or more physical access security systems as there are potential users of the cell phone 32 (or similar cell phones). It is also possible that one or more of the physical access security systems includes more than one door (and thus more than one reader, etc.). In such a case, it would be possible to have a separate special purpose user for each possible door (or subset of doors). Such a system could enhance security by being more selective regarding access, with a corresponding increase in the overhead associated with managing additional access codes. In this embodiment, it may be useful to have the reader(s) provide identifying information to the cell phone 32.

The special purpose users may be changed periodically to enhance security. For example, if every month old special purpose users are revoked and new special purpose users are added, then a terminated/unauthorized user who improperly retains access codes for a special purpose user will not be able to use those codes after a month. The frequency that special purpose user codes are changed is a matter of policy that may be driven by a number of factors, including the sensitivity of an area being protected by a physical access security system, the difficulty of changing access codes (and securely promulgating the new access codes), and the expected turnover/revocation rate of users of the cell phone 32 (or of other, similar, cell phones). In some cases, the creation and deletion of special purpose users may be automated so that, for example, old special purpose users are revoked and new special purpose users are created at set periods of time or after significant events (e.g., after every N times the cell phone 32 is programmed). The automatic or manual change of users may be performed with additional, or pre-existing software modules. The software modules may also be used in instances where there has been a security compromise so that, for example, if a cell phone containing access codes for a particular user is reported as lost, that particular user may be deleted from (denied access to) any physical access security systems.

Figure 11:
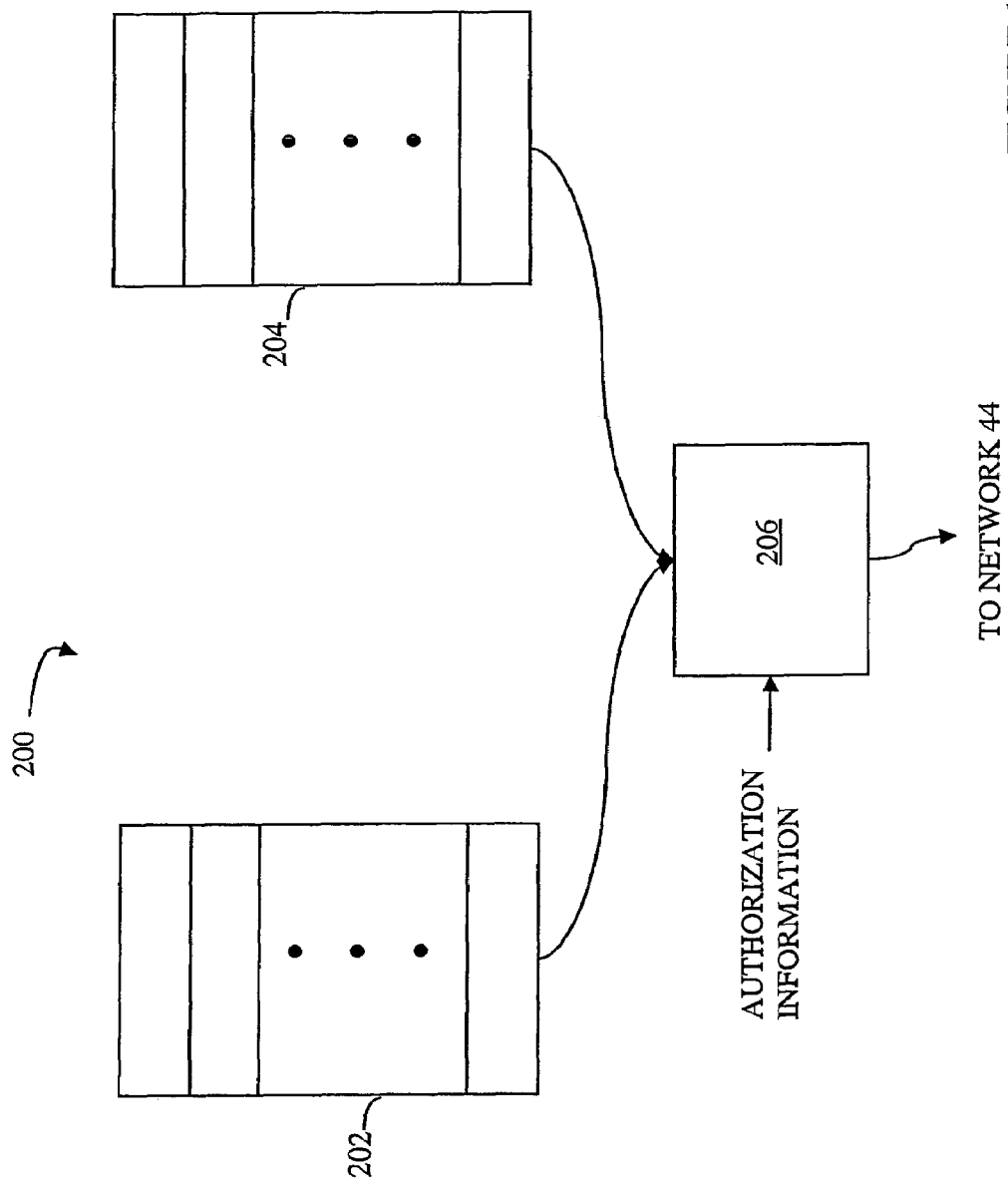
FIG. 11 is a diagram illustrating generating access codes for cell phones according to the system described herein.

Referring to FIG. 11, a diagram 200 illustrates in more detail software that resides on the workstation 42 for programming the cell phone 32. A first table 202 has a plurality of entries, each of which corresponds to a possible user of the cell phone 32 (or similar cell phones). Each entry includes identifying information for the user as well as information needed to program the cell phone of the user. Appropriate security information may also be included.

The diagram 200 also includes a second table 204 of special purpose users that may be used to access the physical access security systems. Each of the entries includes identifying information as well as corresponding access codes. Appropriate security information may also be included.

A generation module 206 is coupled to, and receives information from, both of the tables 202, 204. The generation module 206 also receives authorization information data that indicates to the generation module which of the users from the first table 202 is to have his cell phone programmed with which access codes from the second table 204. In some embodiments, the authorization information may be provided only by one or more authorized users. The authorized users may digitally sign the authorization information and/or otherwise provide an indication that the authorization information is authentic (i.e., the information is authenticated). In some embodiments, the authorization information may include security data that is combined with security data stored with entries of the first and/or second one of the tables 202, 204 to enable activation of the cell phone 32 for accessing physical access security systems. The generation module 206 interfaces with the network 44 to provide appropriate programming information/access codes to the cell phone 32, as described elsewhere herein.

An advantage of the system described herein is that, as long as the cell phone 32 is accessing a cell phone network (i.e., for making voice calls), the cell phone 32 may receive information about access codes. Although tampering with the cell phone 32 may be tempting for an unauthorized user, in some embodiments tamper-proof hardware may be used to detect and/or deter tampering. Note that some or all of the systems 22, 22', 22" may be systems that implement technology such as described in the '126 application, incorporated by reference above. Of course, some or all of the systems 22, 22', 22" may implement some other, unrelated, technology.

Note that the mechanism described in connection with the flow chart 120 may provide a convenient way to remove access codes from a cell phone 32 by simply not providing the next periodic value needed to maintain the access codes. Note also that the value needed to maintain the access codes for each period need not be transmitted in a secure manner even though it is difficult, if not impossible, for anyone to independently determine a future periodic value. The system described herein may also use mechanisms discussed in the '126 application (incorporated by reference, above) to have the cell phone 32 actively cause access codes to be erased in certain circumstances. Any other mechanisms may also be adapted by one or ordinary skill in the art in a straight-forward manner to be used with the system described herein, including, without limitation, mechanisms disclosed in U.S. Pat. Nos. 5,420,927; 5,604,804; 5,610,982; 6,097,811; 6,301,659; 5,793,868; 5,717,758; 5,717,757; 6,487,658; and 5,717,759, all of which are incorporated by reference herein.

Although the system described herein is illustrated using the cell phone 32, it is possible to use any other wireless device capable of receiving access codes over a relatively long range network and transmitting those access codes (perhaps in a different form) to a contactless card reader (or similar device) over a relatively short transmission range. Such other wireless devices may include a PDA, a PDA/cell phone combination device, a Blackberry, and other such devices. Note also that the security mechanism illustrated herein may be used for purposes beyond physical access and may be extended to time and attendance systems (e.g., electronic punch cards), watch stations used by security guards to confirm review of a particular area at a particular time, and/or to any situation where access codes may be used to securely actuate a mechanism.

While the invention has been disclosed in connection with various embodiments, modifications thereon will be readily apparent to those skilled in the art. Accordingly, the spirit and scope of the invention is set forth in the following claims.

What is claimed is:

1. A cell phone that provides access to a restricted area, comprising:
    a storage medium;
    a transmission module coupled to the storage medium;
    executable code stored in the storage medium that accepts access codes provided to the cell phone;
    executable code stored in the storage medium that causes at least some of the access codes to be provided to the transmission module for transmission by the cell phone, wherein the access codes transmitted by the cell phone allow access to the restricted area;
    executable code stored in the storage medium that examines expiration dates provided for each of the access codes provided to the cell phone; and
    executable code stored in the storage medium that, in response to a particular expiration date being prior to a current date, erases from the cell phone the particular one of the access codes that corresponds to the particular expiration date.

2. The cell phone according to claim 1, further comprising:
    executable code stored in the storage medium that stores a final value in the storage medium, wherein the final value corresponds to at least one access code and wherein the final value is the result of applying a one way hash function a plurality of times;
    executable code stored in the storage medium that periodically accepts a value;
    executable code stored in the storage medium that applies the one way hash function to the value to obtain a result thereof; and
    executable code stored in the storage medium that erases the at least one access codes corresponding to the final value in response to the result of applying the one way hash function not being equal to the final value.

3. The cell phone according to claim 1, further comprising:
    executable code stored in the storage medium that determines if there has been tampering with the cell phone; and
    executable code stored in the storage medium that erases all of the access codes in response to tampering.

4. The cell phone according to claim 1, further comprising:
    executable code stored in the storage medium that receives authorization information for a particular user and a particular subset of the access codes; and
    executable code stored in the storage medium that stores the particular subset of the access codes.

5. The cell phone according to claim 1, further comprising:
    executable code stored in the storage medium that logs instances of the cell phone transmitting the access codes to allow access to the restricted area.

6. The cell phone according to claim 1, further comprising:
    executable code stored in the storage medium that determines a subset of the access codes that are to be transmitted by the cell phone.

7. The cell phone according to claim 6, wherein the executable code that determines the subset uses GPS information.

8. A cell phone that provides access to a restricted area, comprising:
    a transmission module; and
    an access code control module coupled to the transmission module, wherein the access code module includes:
        executable code that accepts access codes provided to the cell phone;
        executable code that assesses at least one access code in an assessment process;
        executable code that automatically determines if the at least one access code should be erased as a result of the assessment process;
        executable code that causes at least some of the access codes to be provided to the transmission module for transmission by the transmission module, wherein the access codes transmitted by the cell phone allow access to the restricted area;
        executable code that examines expiration dates provided for each of the access codes provided to the cell phone; and
        executable code that, in response to a particular expiration date being prior to a current date, erases from the cell phone the particular one of the access codes that corresponds to the particular expiration date.

9. The cell phone according to claim 8, wherein the access control module further includes:
    executable code that stores a final value in the storage medium, wherein the final value corresponds to at least one access code;
    executable code that periodically accepts a value;
    executable code that applies a one way function to the value to obtain a result thereof; and
    executable code that erases the at least one access codes corresponding to the final value in response to the result of applying the one way function to the value not being equal to the final value.

10. The cell phone according to claim 9, wherein the result is generated by applying the one way function a plurality of times.

11. The cell phone according to claim 10, wherein the value accepted by the cell phone corresponds to a first time/date and wherein the plurality of times the one way function is applied corresponds to the first time/date and a second time/date associated with the final value.

12. The cell phone according to claim 8, wherein the access code control module further includes:
    executable code that determines if there has been tampering with the cell phone; and
    executable code that erases all of the access codes in response to tampering.

13. The cell phone according to claim 8, wherein the access code control module further includes executable code that determines a subset of the access codes that are to be transmitted by the cell phone.

14. The cell phone according to claim 13, wherein the executable code that determines the subset uses GPS information.

15. A method of actuating a security system using a cell phone, comprising:
    providing a first set of access codes to a cell phone, wherein the first set of access codes provided to the cell phone expire;
    causing the cell phone to transmit at least some of the first set of access codes to a first controller that actuates the security system; and assessing at least one of the first access codes in an assessment process; and automatically determining if the at least one of the first access codes should be erased based on a result of the assessment process, wherein the assessing at least one of the first access codes and automatically determining if the at least one of the first access codes should be erased includes: providing expiration dates for each of the first set of access codes provided to the cell phone; examining each of the expiration dates; and in response to a particular expiration date being prior to a current date, erasing from a storage medium the particular one of the first set of access codes that corresponds to the particular expiration date.

16. The method according to claim 15, wherein the assessing at least one of the first access codes and automatically determining if the at least one of the first access codes should be erased includes:

providing to the cell phone a final value that corresponds to the at least one of the first set of access codes, wherein the final value is the result of applying a one way function a plurality of times;

periodically providing a value to the cell phone;

applying the one way hash function to the value to obtain a result thereof; and erasing the at least one of the first set of access codes corresponding to the final value in response to the result of applying the one way function not being equal to the final value.

17. A method of actuating a security system using a cell phone, comprising:

providing a first set of access codes to a cell phone, wherein the first set of access codes provided to the cell phone expire;

causing the cell phone to transmit at least some of the first set of access codes to a first controller that actuates the security system;

assessing at least one of the first access codes in an assessment process;

automatically determining if the at least one of the first access codes should be erased based on a result of the assessment process;

providing a second set of access codes to the cell phone; and causing the cell phone to transmit the second set of access codes to a second controller, wherein the first and second controllers are incompatible.

* * * * *